(12) United States Patent
Porte

(10) Patent No.: US 7,506,838 B2
(45) Date of Patent: Mar. 24, 2009

(54) AIR INTAKE STRUCTURE FOR AIRCRAFT ENGINE

(75) Inventor: Alain Porte, Colomiers (FR)

(73) Assignee: Airbus France, Toulouse (FR)

( * ) Notice: Subject to any disclaimer, the term of this patent is extended or adjusted under 35 U.S.C. 154(b) by 720 days.

(21) Appl. No.: 11/086,380

(22) Filed: Mar. 23, 2005

(65) Prior Publication Data

US 2005/0269443 A1    Dec. 8, 2005

(30) Foreign Application Priority Data

Mar. 29, 2004 (FR) .................................. 04 50612

(51) Int. Cl.
*B64B 1/24* (2006.01)

(52) U.S. Cl. .................. 244/53 B; 123/41.7; 137/15.1; 416/DIG. 7; 416/189; 416/190; 416/192

(58) Field of Classification Search .............. 244/53 B; 123/41.7; 137/15.1; 416/DIG. 7, 189, 190, 416/192

See application file for complete search history.

(56) References Cited

U.S. PATENT DOCUMENTS

| | | | | |
|---|---|---|---|---|
| 6,027,078 A | * | 2/2000 | Crouch et al. | ................ 244/204 |
| 6,131,855 A | * | 10/2000 | Porte | ....................... 244/134 B |
| 6,328,258 B1 | * | 12/2001 | Porte | ........................ 244/53 B |

FOREIGN PATENT DOCUMENTS

GB    1 427 339 A    3/1976

* cited by examiner

*Primary Examiner*—J. Woodrow Eldred
(74) *Attorney, Agent, or Firm*—Oblon, Spivak, McClelland, Maier & Neustadt, P.C.

(57) ABSTRACT

The aft stiffening frame of an air intake structure for an aircraft engine nacelle is made with an inflection area such that the part between the inflection area and one of its ends could be subjected to a large deformation when a constraint occurs in the direction of the frame part defined by the inflection area and its other end, usually normal to the casing. This particular shape of the aft stiffening frame makes it possible to improve its flexibility so that the air intake structure has better resistance to severe deformed shapes that could occur, for example, when a fan breaks on a wide body aircraft.

7 Claims, 2 Drawing Sheets

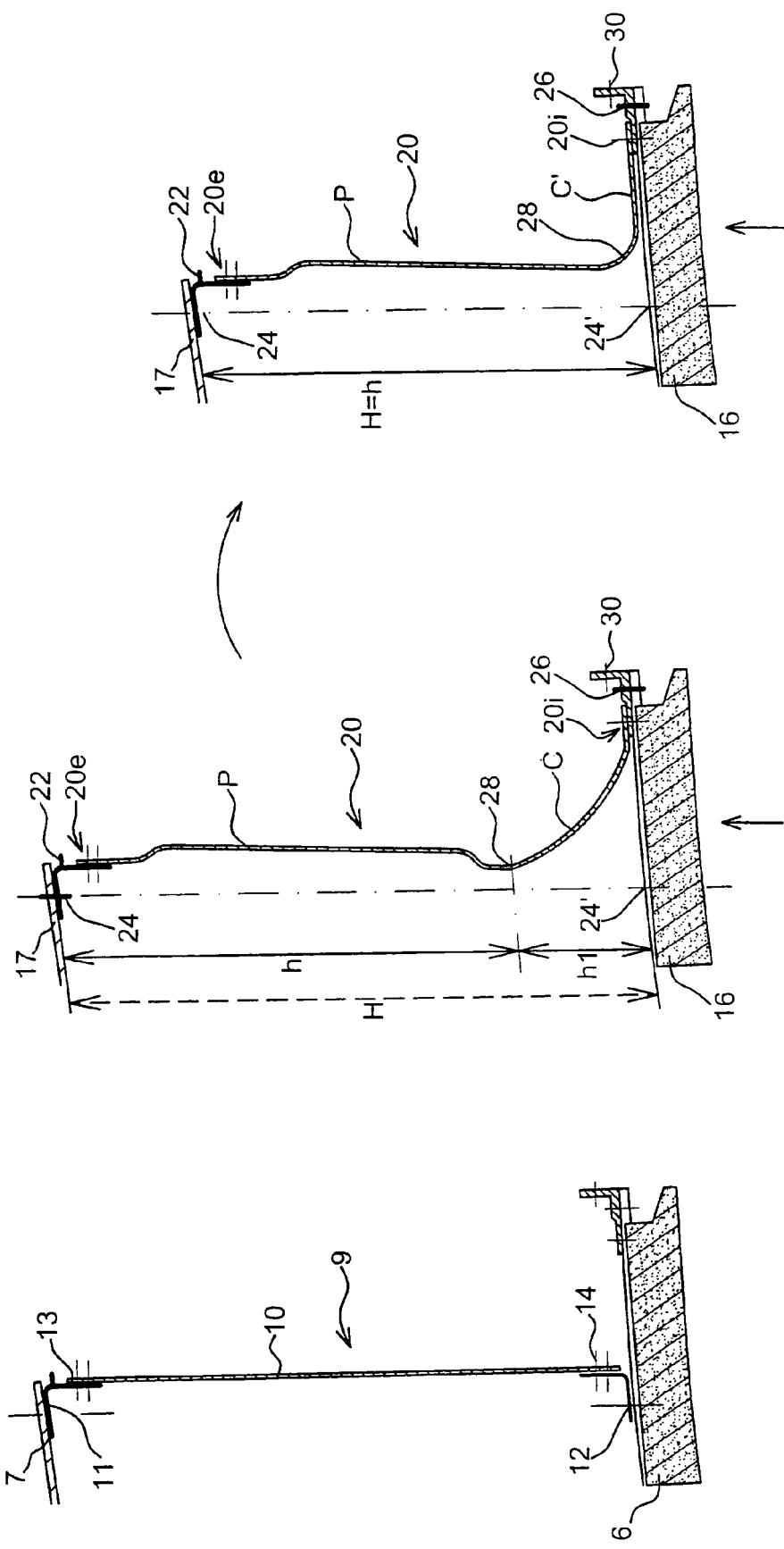

AIR INTAKE STRUCTURE FOR AIRCRAFT ENGINE

TECHNICAL FIELD

The invention relates to nacelles that could be used for any type of engine or turbojet, particularly in aircraft.

More precisely, the invention relates to the air intake structure of the nacelle and the stiffness of stiffening means at the aft end.

BACKGROUND ART

As shown very diagrammatically in perspective in FIG. 1 on the attached drawings, an aircraft engine comprises a central part 1 in which the engine itself is housed, and an annular part 2 called the nacelle surrounding the central part of the engine coaxially and delimiting an annular duct 3, called the fan duct, with it. A fan, driven by the central part 1 of the engine, is located in this duct 3 at the fan cowls.

The front part of the nacelle 2 forms an air intake structure 4. This structure has the particular function of controlling aerodynamic air flow firstly towards the fan duct 3, and secondly towards the outside of the nacelle 2. This type of structure normally comprises an air intake lip 5 (see FIG. 2) that is added onto the inner casing 6 and the outer casing 7 of the nacelle 2. By convention, if not mentioned otherwise, the terms "inner" and "outer" will be used to denote the position or orientation of parts with respect to the fan duct of the air intake structure.

Normally, the inner casing 6, i.e. the side of the fan duct 3 at the aft end of the air intake lip 5, is composed of a sound proofing panel. This panel has its own structure capable of attenuating noise produced by the central part of the engine, and particularly by the fan. In practice, this structure is normally of the composite sandwich type, in other words the panel 6 comprises a honeycomb core.

The air intake lip 5 has a cross section in the shape of a U open in the aft direction. It forms the outer casing of the forward part of the air intake structure. It shares air between the part that penetrates into the fan duct and the part that flows around the nacelle 2.

A forward stiffening frame 8 and an aft stiffening frame 9 can pass through the structure between the inner and outer casings, in order to stiffen the structure 4. By convention, the terms "forward" and "aft" will be used throughout this text with reference to the forward and aft direction of the engine.

The forward stiffener frame 8 is placed inside and towards the aft of the air intake lip 5, at the intake end of the annular part formed by the casings 6 and 7. The aft stiffening frame 9 is placed inside the nacelle 2 close to the fan cowls, forward from the engine attachment area; the engine attachment area is located at an attachment area between the air intake and the fan cowls, but actually outside the sound proofing panel of the inner casing 6 for which it would destroy the characteristics. The function of the stiffening frames 8, 9 is to provide mechanical strength for the forward part of the nacelle and help preserve its shape and size. Consequently, they may be fixed using rivets or screws, for example to the nacelle 2, or for the forward stiffening frame 8 directly to the air intake lip 5.

Some examples of such an air intake structure are shown in American patent U.S. Pat. No. 6,328,258.

When developing a new aircraft engine, many tests are carried out including one test to check that the surrounding structure of the engine that encompasses particularly the air intake structure 4, is capable of resisting the breakage of a fan blade or a turbine blade in the core of the engine. The surrounding structure as a whole must be able to contain the piece of a broken blade so that it does not damage a vital part of the aircraft.

To achieve this, an engine is started up on a test bench on the ground under conditions as close as possible to its operation on the aircraft. A fan blade is deliberately damaged so that it will break during rotation of the fan. The piece of blade that was broken off moves in a centrifugal rotation movement and strikes the surrounding structures that are deformed. In particular, the air intake structure 4 follows an undulating movement, but it must not break.

To achieve this, the aft stiffening frame 9 increases the range of deformations of the air intake structure 4 for which the structure will not break; due to its flexibility, forces are absorbed and the frame can thus avoid damage to the air intake structure if a fan blade should break.

However, in the past, the dimensions of aircraft engine fan blades did not generate excessive amplitudes of the undulating movement and therefore the deformations of the air intake structure could be contained within limits that prevented breakage. With the arrival of aircraft engines with a greater by-pass ratio and/or a greater fan diameter (for example engines for use on the heaviest wide body type aircraft), a broken piece of fan blade would have a much higher kinetic energy; the amplitude of the undulating movement generated by such a piece leads to deformations of structures surrounding the engine so large that they could break the aft stiffening frames or the components to which they are fixed, and therefore the air intake structure.

Therefore existing techniques cannot prevent serious damage to these structures.

SUMMARY OF THE INVENTION

The purpose of this invention is to overcome the disadvantages inherent to existing stiffening systems, particularly in the case in which a fan blade separates from the fan of an engine with a high by-pass ratio or a large fan diameter.

According to one of its aspects, the invention relates to the geometry of stiffening means designed for the air intake structure for an aircraft engine such that attachment at both ends, normally parallel to each other, of the stiffening means does not prevent them from being deformed, for example and particularly from having an undulating or even elastic nature.

In particular, a stiffening frame according to the invention has an approximately plane structure between one of its ends and a curvature inflection area, such that application of a force for which one component is perpendicular to the ends and in said plane, in other words a force along the radial direction or perpendicular to the horizontal axis of the engine when the frame is mounted in an air intake structure, causes a preferably elastic deformation of the stiffening frame between its other end and the inflection area. In this way, the general height of the stiffening frame, determined by the projection of its two ends onto the plane, reduces so that parts attached to the ends can temporarily move towards each other. Thus, large deformations of structures surrounding the ends of the stiffening frame can be compensated.

It is preferred if the distance thus compensated is equal to at least 20% of the total height of the stiffening frame. It is possible that the length of the plane is minimum or even almost zero.

Therefore according to another aspect, the invention relates to a stiffening frame that forms a regular curve between the first end portion and the second end portion under normal operation in a section orthogonal to the end portions, the inflection area then being coincident with the first end portion.

Advantageously, the stiffening frame defined between the inflection area and the end that does not delimit the plane has a surface with a regular curvature, and preferably approximately following the arc of a circle in a radial cross-section when it is mounted. It is desirable that the tangent to the curve at the second end should be perpendicular to the plane so as to facilitate attachment.

In an air intake structure comprising an annular part delimited by an inner casing and an outer casing, the stiffening means, namely the stiffening frame is fixed at one end to the inner casing and at the other end to the outer casing, the distance between the two casings being equal to the height of the stiffening frame at rest, the plane of which is usually perpendicular to the two casings. Thus, the air intake structure can resist a deformation equivalent to the distance separating the inflection area from the second end, or a sequence of such deformations, the two casings moving towards each other without breaking the stiffening frame.

Advantageously, the end fixed on the inner casing is further aft than the end fixed on the outer casing. Preferably, the end fixed on the outer casing is fixed to the engine fastening area, if possible on the attachment plate on which the engine is fixed.

The stiffening means may be made of metal, for example titanium, or a composite material; advantageously, they are fixed by rivets or screws.

BRIEF DESCRIPTION OF THE DRAWINGS

The attached figures will help to better understand the invention, but they are only given for guidance and they are in no way restrictive.

FIG. 3 is a longitudinal section showing details of a known longitudinal stiffening frame.

FIGS. 4a and 4b are longitudinal sections showing an aft stiffening frame according to the invention in an air intake structure at rest (FIG. 4a) and after being deformed (FIG. 4b).

DETAILED DESCRIPTION OF PREFERRED EMBODIMENTS

Figure 1:
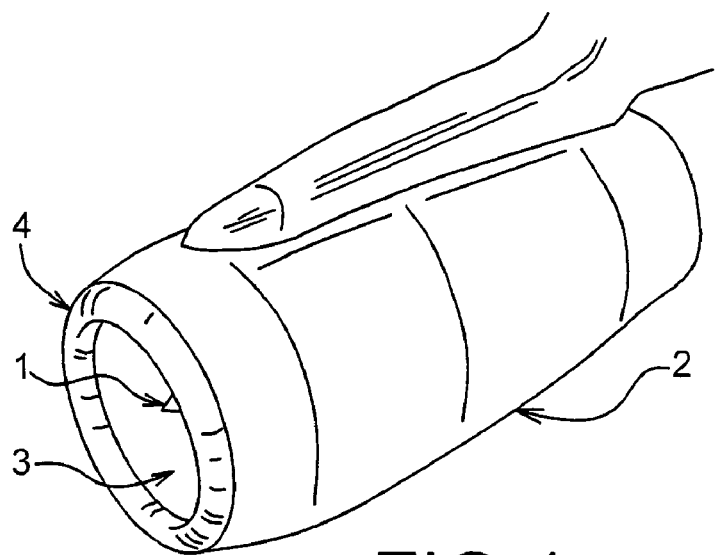
FIG. 1, already described, shows an aircraft engine.
Figure 2:
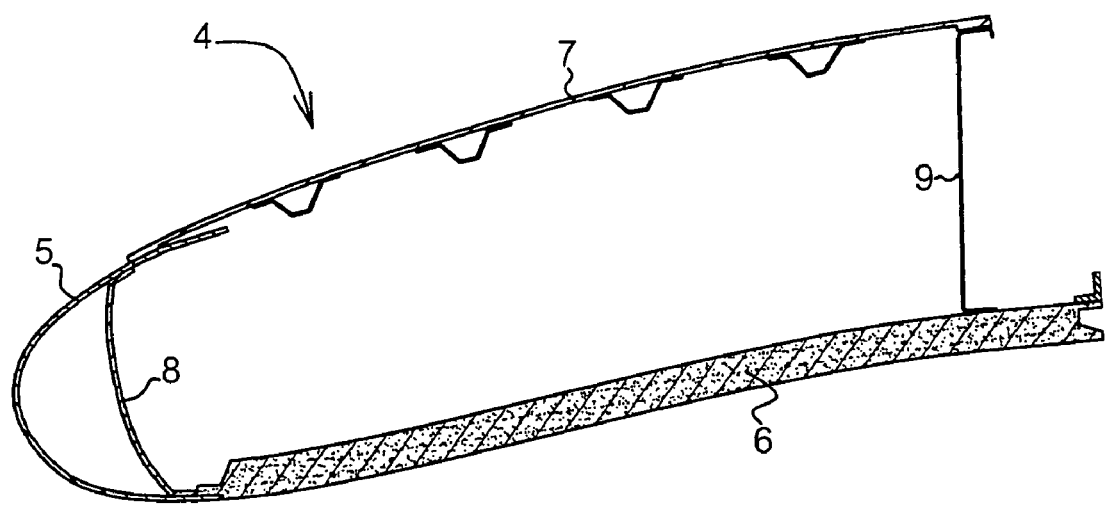
FIG. 2, already described, is a longitudinal sectional view illustrating a first known embodiment of an air intake structure that illustrates existing stiffeners.

As mentioned above, the aft stiffening frames 9 keep the air intake structure 4 in good condition when mechanical loads are applied. Furthermore, due to their flexibility, they can resist some deformations of the air intake structure 4, and thus prevent damage to it if a fan blade is broken.

The figures will be described mainly with reference to the longitudinal sectional view of the air intake structure, in which for example the ends are shown by dots. However, it should be understood that the stiffening frames are located in the annular space 3 of the nacelles 2. When looking at the front view of the air intake structure 4, they may be in the form of rings (the inside diameter of which is delimited by the second end), or a trapezoidal profile (derived from a section through the rings), for which the parallel sides are arcs of a circle defined by the end portions. In this respect, although the end portions may be qualified as being "concentric", particularly in the case of rings, the term "parallel" will be preferred and will be used in the rest of this description; it relates to the same concept as "any normal to one of the curves is a normal to the other curve", but it is easier to check in the case of arcs of a circle with a small angle; the ends of existing stiffening frames may be of the order of 15-20 cm wide, for a very much larger inner casing diameter.

As shown in FIG. 3, one of the possible geometries for the stiffening means 9 comprises a stiffening frame 10 itself associated with attachment elements 11, 12. Two attachment parts 13, 14 are associated with each end of the aft stiffening frame 10 and will be fixed to the fastening elements 11, 12 respectively, particularly by rivets, the fastening elements themselves being fixed to the outer casing 7 and to the inner casing 6 of the air intake structure 4, partially shown in this figure, also for example by rivets. The sectional view of the stiffening means assembly 9 is almost straight, such that the fastening elements, or attachment points 11 and 12 are almost facing each other along a normal to the inner casing 6; the plane defined by the stiffening frame 10 is preferably orthogonal to the casings 6, 7 to maintain the general shape of the air intake structure 4 as well as possible.

Furthermore, the general shape of the stiffening frame 10, and particularly its small thickness in comparison with its length, assures that it is flexible to some extent, so that it can follow the deformations of the inner casing 6 generated by the low amplitude of an undulating movement caused by the breakage of a fan blade.

To improve the flexibility of the assembly 9, and particularly, in the case of an excessive deformation of the casing 6, to prevent failure of the stiffening frame 10 that would be damaging and could cause additional damage to the casings, it has conventionally been proposed to introduce fusible attachments 11, 12 to limit the damage to the stiffening frame 10 or the sound proofing panel from which the inner casing 6 is made.

According to the invention, it has been found that it is possible to modify the geometry of the stiffening frame 10 itself without altering its support properties in a manner incompatible with its use. In particular, it has been shown that at least part of the stiffening frame might not be orthogonal to the inner and outer casings, so that said stiffening frame can have a movement flexibility that would not be possible if its both ends were located in the same plane.

FIG. 4a diagrammatically shows an air intake structure comprising a stiffening frame 20 according to the invention. In this figure, which corresponds to FIG. 3 except for the stiffening structure, the nacelle 2 has also only partially been shown and the stiffening frame is located at the aft side. It will appear more clearly later that this alternative is preferred but the stiffening frame according to the invention may be located at other locations on the air intake structure. However, it is not really a stiffening element of the air intake lip 5 as such; such an element, for example presented in document U.S. Pat. No. 6,328,258, is responsible for the stiffness and for maintaining the shapes and dimensions of the forward part of the nacelle 2 in the case of frontal shocks, for example due to birds, and in principle it is solid and is designed to be non compressible, unlike the frame according to the invention.

The aft stiffening frame 20 is fixed at its external end portion 20e, more generally called the end, at the top on the figure, through a metallic attachment plate 22, by first attachment elements 24, to the outer casing 17 of the nacelle, on its aft part. In the embodiment shown, the fixing between the stiffening frame 20 and the outer casing 17 is made by a metallic attachment plate 22 that is fixed to the outer casing by rivets 24, and to which the outer end 20e of the stiffening frame 20 is fixed by any means known to those skilled in the art, for example also by rivets. It is clear that this embodiment is only one possible alternative, shown here to correspond to FIG. 3. Any existing attachment already used for this type of application, and alternatives known to those skilled in the art, would also be possible.

Furthermore, the stiffening frame 20 is fixed at its inner end or lower end 20i, by second attachment means 26 to the aft part of the inner casing 16 of the air intake structure of the nacelle 2. These second attachment means may be composed of any of the alternatives presented above for the first solidarisation means 22, 24, and the inner end 20i must not be interpreted as being the section line, but rather as a portion delimiting the end of the frame.

To enable the modification to the geometry recommended by the invention, the stiffening frame 20 has an inflection area or portion 28 located at a first length h from the first end, in this case the outer end 20e of the frame. On this first length h, the stiffening frame 20 approximately defines a first plane P. When mounting on the air intake structure 4, and in a similar manner to the known stiffening frames 10, the first plane P is approximately orthogonal to the inner casing 16 and outer casing 17 of the air intake structure and forms part of the height separating the two casings.

However, the inflection area 28, advantageously in the form of a line parallel to lines delimiting the ends 20e and 20i of the frame in a front view of the air intake structure 4, defines a direction change for the stiffening frame 20 and a plane break; in a longitudinal section, the part of the stiffening frame 20 located between the inflection point 28 and the second end 20i is no longer straight but is now curved as shown in FIG. 4a. Therefore the length of the stiffening frame 20 between the second end 20i and the inflection point 28 is greater than the height h1 separating this inflection point 28 from the normal projection of the second end 20i on the plane P. For this type of stiffening frame 20, the distance or height H separating the inner casing 16 and the outer casing 17 of the air intake structure 4 on which it is mounted, is therefore of the order of h+h1, which is less than the total length of the stiffening frame 20 measured along its surface.

When a stress, particularly a compression stress, is applied to the stiffening frame 20 along the radial direction of the air intake structure 4 (along the direction of the arrows in FIG. 4), the presence of the inflection portion 28 enables crushing of the curve C and accentuation of the inflection. Therefore the height H defined by the frame reduces and at the end, can reach the first length h of the plane P; in this case shown in FIG. 4b, the curve C will be completely flattened to become almost plane C' perpendicular to plane P, which remains in its shape.

Therefore this type of stiffening frame 20 can for example compensate for deformations of the inner casing 16 with an amplitude that can be up to h1, in other words the distance H separating the two casings reduces to h at the first attachment means 24. Advantageously, it then returns to its normal operating shape; in particular, an undulating movement due to the presence of objects in the fan duct 3 is tolerated by the inner casing 16 that returns to its shape when the undulating movement stops.

It is possible that the curved part C of the stiffening means 20 has in arbitrary shape, but it is preferable if it has a regular shape. Similarly, although a U shape is possible, it is preferable that the inner end 20i should be the point on the curve C furthest from the orthogonal projection of the inflection point 28 onto the inner casing 16, for example as a result of a curve C approximately in the shape of an arc of a circle, to prevent any risk of breakage. In order to facilitate the connection of the stiffening frame 20 with the inner casing 16, it is advantageous if the tangent at the curve C at the second end 20i is perpendicular to the first plane P, in other words parallel to the casing 16.

Advantageously, in order to achieve a good compromise between the range of deformations that can be compensated and a correct maintaining of the distance between the two casings, it is desirable that the height h1 that can be compensated is of the order of 20% of the distance H=h+h1 between the two casings. However, it is possible that the length h of the plane P is less than 80% of the height H separating the casings 16, 17, or even that it is close to zero, in this case with a stiffening frame 20 essentially following curve C.

It is preferable that flattening of the curve C and compensation of the deformation should be done near the back of the plane P, in other words the projection 24' of the first attachment means on the inner casing 16 should be located between the second end 20i of the stiffening frame 20 and the structure intake.

Furthermore, the air intake structure 4 and the engine are usually fixed through a metallic attachment plate 30. It is then advantageous for the second attachment means 26 of the aft stiffening frame 20 to benefit from the location of this attachment and for the inner end 20i of the aft stiffening frame 20 to be fixed to the existing metallic attachment 30, the offset between this attachment plate 30 and the normal projection 24' of the anchor point 24 onto the inner casing 16 being compensated by the shape of the aft frame 20 according to the invention. Furthermore, this alternative enables a metal-metal connection between the rivet 26 and the attachment 30 that does not produce a galvanic couple that could damage said attachments. The position of the attachment plate 30 also avoids perforating the sound proofing panel 16, thus maintaining its integrity and sound proofing qualities.

In this example embodiment shown in FIG. 4, the metallic attachment plate 30 is in the shape of an "L" on its back. Obviously, this attachment may have different shapes without going outside the scope of the invention. Similarly, the example shown relates to an aft stiffening frame 20 derived from that 10 shown in FIG. 3. It is obvious that other embodiments could be considered, the invention being applied with the same advantages; the second end delimiting the curve part C of the stiffening frame may thus be fixed to the outer casing of the air intake structure.

The invention claimed is:

1. Stiffening frame for an air intake structure for an aircraft engine, comprising a first end portion, an intermediate portion, and a second end portion, the intermediate portion being an inflection portion such that in a section orthogonal to the end portions, the frame approximately defines a first straight line between the first end portion and the intermediate portion, and it defines a regular non-null curve between the second end portion and the inflection portion, the tangent to the curve at the second end portion being perpendicular to the first plane corresponding to the first straight line, the height of the stiffening frame defined between the first end portion and the normal projection of the second end portion onto the first plane being between a first height and, when the stiffening frame is compressed by a force with a component which is perpendicular to the direction of the second end portion and in the first plane, a second height at least 20% less than the first height.

2. Air intake structure for an aircraft engine, comprising an annular part defining a fan duct which comprises an intake end, an outer casing, an inner casing, and a stiffening frame according to claim 1, the first end portion of which is fixed to the outer casing through a first fastening element and the second end portion is fixed to the inner casing through a second fastening element, the inner and outer casings being separated by the height of the stiffening frame under normal operation.

3. Structure according to claim 2, in which the projection according to the first plane of the first fastening element onto the inner casing is located between the intake end of the annular part and the second fastening element.

4. Structure according to claim 2 in which the stiffening frame is fixed to the casings through rivets.

5. Structure according to claim 2 in which the inner casing is formed of a sound proofing panel.

6. Structure according to claim 2 in which the stiffening frame is located next to an engine attachment area, remote from the intake end of the annular part.

7. Structure according to claim 6 in which the inner casing comprises a metallic attachment plate to fasten the engine, and in which the second end portion of the stiffening frame is fixed to the attachment plate.

* * * * *